(12) United States Patent
Kang et al.

(10) Patent No.: US 12,126,034 B2
(45) Date of Patent: Oct. 22, 2024

(54) BATTERY CELL AND BATTERY MODULE COMPRISING SAME

(71) Applicant: LG Energy Solution, Ltd., Seoul (KR)

(72) Inventors: Min-Hyeong Kang, Daejeon (KR); Sang-Hun Kim, Daejeon (KR); Dae-Woong Song, Daejeon (KR); Hyung-Kyun Yu, Daejeon (KR); Hun-Hee Lim, Daejeon (KR); Soo-Ji Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/580,932

(22) PCT Filed: Jan. 20, 2023

(86) PCT No.: PCT/KR2023/001068
§ 371 (c)(1),
(2) Date: Jan. 19, 2024

(87) PCT Pub. No.: WO2023/153673
PCT Pub. Date: Aug. 17, 2023

(65) Prior Publication Data
US 2024/0266652 A1    Aug. 8, 2024

(30) Foreign Application Priority Data

Feb. 14, 2022   (KR) .......................... 10-2022-0018745

(51) Int. Cl.
*H01M 50/178* (2021.01)
*H01M 50/121* (2021.01)
(Continued)

(52) U.S. Cl.
CPC ....... *H01M 50/178* (2021.01); *H01M 50/121* (2021.01); *H01M 50/131* (2021.01);
(Continued)

(58) Field of Classification Search
CPC ............ H01M 50/186; H01M 50/184; H01M 50/178; H01M 50/30; H01M 50/317; H01M 50/342; H01M 50/3425
See application file for complete search history.

(56) References Cited

U.S. PATENT DOCUMENTS

2006/0238162 A1   10/2006 Cheon et al.
2013/0011722 A1   1/2013 Ahn
(Continued)

FOREIGN PATENT DOCUMENTS

CN        105684183 A      6/2016
CN        106067525 A     11/2016
(Continued)

OTHER PUBLICATIONS

International Search Report for PCT/KR2023/001068 mailed May 17, 2023. 3 pgs.
(Continued)

*Primary Examiner* — Amanda J Barrow
(74) *Attorney, Agent, or Firm* — Lerner David LLP (57) ABSTRACT

A battery cell including a case and an electrode assembly. The case having an accommodation portion in which the electrode assembly is mounted, and a sealing portion formed by sealing an outer periphery thereof. An electrode tab of the electrode assembly is electrically connected to an electrode lead that protrudes out of the case through the sealing portion. A lead film is located at a portion corresponding to the sealing portion in at least one of an upper portion or a lower portion of the electrode lead. The lead film has a dented portion recessed in an outer direction of the case and that is open toward the inside of the case. The sealing portion has an indented sealing portion that does not overlap with at least a part of the gas discharge portion on a plane.

20 Claims, 7 Drawing Sheets

(51) Int. Cl.
  *H01M 50/131* (2021.01)
  *H01M 50/184* (2021.01)
  *H01M 50/186* (2021.01)
  *H01M 50/342* (2021.01)

(52) U.S. Cl.
  CPC ....... *H01M 50/184* (2021.01); *H01M 50/186* (2021.01); *H01M 50/3425* (2021.01)

(56) References Cited

U.S. PATENT DOCUMENTS

| | | | |
|---|---|---|---|
| 2014/0199581 A1 | 7/2014 | Ryu et al. | |
| 2016/0315301 A1* | 10/2016 | Kim | H01M 50/3425 |
| 2018/0114964 A1* | 4/2018 | Kim | H01M 50/172 |
| 2021/0005872 A1 | 1/2021 | Lee et al. | |
| 2022/0320588 A1 | 10/2022 | Jung et al. | |
| 2023/0084670 A1* | 3/2023 | Lim | H01M 50/367 |
| | | | 429/53 |
| 2023/0163386 A1* | 5/2023 | Lim | H01M 50/105 |
| | | | 429/163 |
| 2023/0352780 A1* | 11/2023 | Lim | H01M 50/557 |
| 2023/0402704 A1* | 12/2023 | Song | H01M 50/198 |
| 2023/0411769 A1* | 12/2023 | Song | H01M 50/30 |
| 2024/0106070 A1* | 3/2024 | Song | H01M 50/186 |

FOREIGN PATENT DOCUMENTS

| | | | | |
|---|---|---|---|---|
| CN | 212874708 U | | 4/2021 | |
| CN | 113994527 A | | 1/2022 | |
| JP | 2000067846 A | | 3/2000 | |
| JP | 2002-324525 A | | 11/2002 | |
| KR | 20060112035 A | | 10/2006 | |
| KR | 101240753 B1 | | 3/2013 | |
| KR | 10-2013-0064465 | * | 6/2013 | ............ H01M 10/02 |
| KR | 20140091441 A | | 7/2014 | |
| KR | 101547403 B1 | | 8/2015 | |
| KR | 20160126157 A | | 11/2016 | |
| KR | 20170025872 A | | 3/2017 | |
| KR | 20170027150 A | | 3/2017 | |

OTHER PUBLICATIONS

Notice of Allowance for Korean Patent Application. 10-2022-0018745 issued Jan. 6, 2023. 12 pgs.

* cited by examiner

FIG. 1

PRIOR ART

FIG. 2

PRIOR ART

BATTERY CELL AND BATTERY MODULE COMPRISING SAME

CROSS-REFERENCE TO RELATED APPLICATIONS

The present application is a national phase entry under 35 U.S.C. § 371 of International Application No. PCT/KR2023/001068 filed on Jan. 20, 2023, which claims priority to Korean Patent Application No. 10-2022-0018745 filed on Feb. 14, 2022, in the Republic of Korea, the disclosures of which are incorporated herein by reference.

TECHNICAL FIELD

The present disclosure relates to a battery cell and a battery module including the same, and more particularly, to a battery cell with an improved external discharge amount of gas generated in the battery cell, and a battery module including the same.

BACKGROUND ART

As technology development and demand for mobile devices increase, the demand for secondary batteries as an energy source is rapidly increasing. In particular, secondary batteries are of great interest as energy sources not only for mobile devices such as mobile phones, digital cameras, notebooks and wearable devices, but also for power devices such as electric bicycles, electric vehicles and hybrid electric vehicles.

Depending on the shape of a battery case, these secondary batteries are classified into a cylindrical battery and a prismatic battery in which an electrode assembly is included in a cylindrical or prismatic metal can, and a pouch-type battery in which the electrode assembly is included in a pouch-type case of an aluminum laminate sheet. Here, the electrode assembly included in the battery case is a power element including a positive electrode, a negative electrode, and a separator interposed between the positive electrode and the negative electrode, and capable of charging and discharging, and is classified into a jelly-roll type in which long sheet-type positive and negative electrodes coated with an active material are wound with a separator being interposed therebetween, and a stack type in which a plurality of positive and negative electrodes are sequentially stacked with a separator being interposed therebetween.

Among them, in particular, a pouch-type battery in which a stack-type or stack/folding-type electrode assembly is included in a pouch-type battery case made of an aluminum laminate sheet is being used more and more due to low manufacturing cost, small weight, and easy modification.

Figure 1:
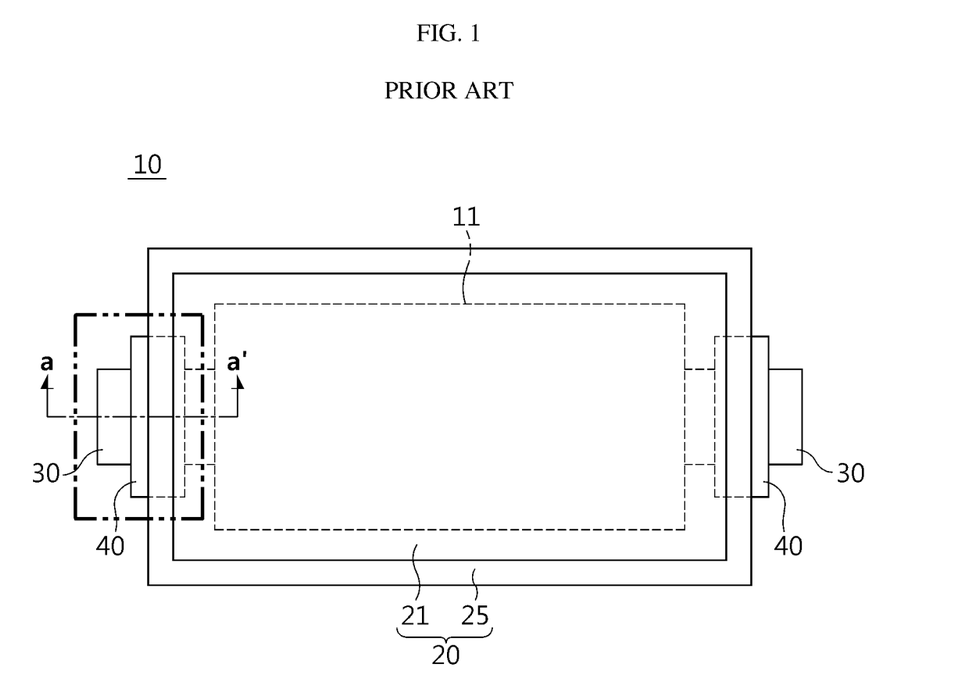
FIG. 1 is a top view showing a conventional battery cell.
Figure 2:
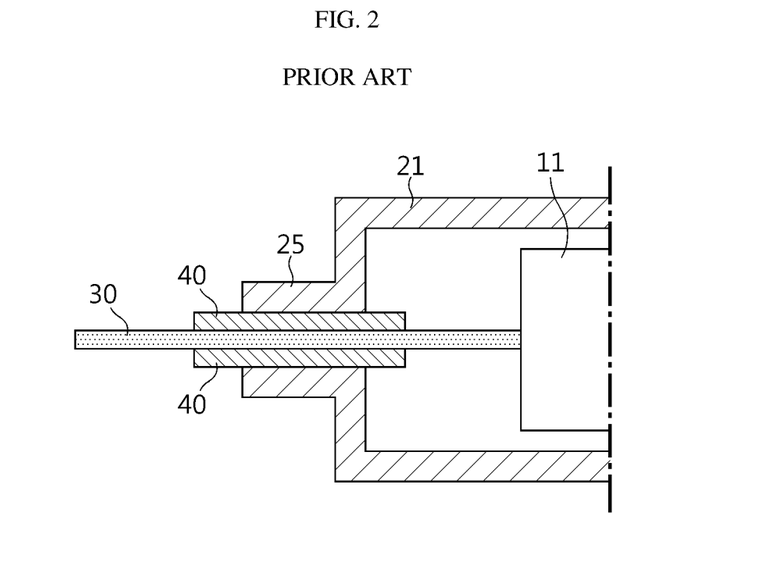
FIG. 2 is a cross-sectional view, taken along the axis a-a' of FIG. 1.

FIG. 1 is a top view showing a conventional battery cell. FIG. 2 is a cross-sectional view, taken along the axis a-a' of FIG. 1. Referring to FIGS. 1 and 2, a conventional battery cell 10 includes a battery case 20 having an accommodation portion 21 in which an electrode assembly 11 is mounted, and a sealing portion 25 formed by sealing an outer periphery thereof. Here, the conventional battery cell 10 includes an electrode lead 30 protruding out of the battery case 20 through the scaling portion 25, and a lead film 40 is located between upper and lower portions of the electrode lead 30 and the sealing portion 25.

However, as the energy density of the battery cell increases in recent years, there is a problem that the amount of gas generated inside the battery cell also increases. In the case of the conventional battery cell 10, a component capable of discharging the gas generated inside the battery cell is not included, so a venting phenomenon may occur in the battery cell due to gas generation. In addition, moisture may penetrate into the battery cell damaged by the venting, which may cause side reactions, and there is a problem that battery performance deteriorates and additional gas is generated. Accordingly, there is an increasing need to develop a battery cell with improved external emission of gas generated inside the battery cell.

DISCLOSURE

Technical Problem

The present disclosure is directed to providing a battery cell with an improved external discharge amount of gas generated in the battery cell, and a battery module including the same.

The object to be solved by the present disclosure is not limited to the above-mentioned object, and the objects not mentioned here may be clearly understood by those skilled in the art from this specification and the accompanying drawings.

Technical Solution

In one aspect of the present disclosure, there is provided a battery cell, comprising: a battery case having an accommodation portion in which an electrode assembly is mounted, and a sealing portion formed by sealing an outer periphery thereof; an electrode lead electrically connected to an electrode tab included in the electrode assembly and protruding out of the battery case through the sealing portion; and a lead film located at a portion corresponding to the sealing portion in at least one of an upper portion and a lower portion of the electrode lead, wherein the lead film has a dented portion recessed in an outer direction of the battery case, the dented portion is open toward the inside of the battery case, the sealing portion located on a gas discharge portion of the dented portion has an indented sealing portion recessed inward at an outer side of the battery case, and the indented sealing portion does not overlap with at least a part of the gas discharge portion on a plane.

The gas discharge portion of the dented portion may be exposed to the outside of the battery case.

The dented portion may include a first dented portion and a second dented portion, the first dented portion may extend along a protruding direction of the electrode lead, and the second dented portion may extend along a longitudinal direction of the sealing portion. One end of the first dented portion may be open toward the inside of the battery case, and the other end of the first dented portion may communicate with the second dented portion.

The indented sealing portion may be located on the second dented portion.

The indented sealing portion may extend along the longitudinal direction of the second dented portion.

The length of the indented sealing portion may be equal to or greater than the length of the second dented portion.

The width of the indented sealing portion may be equal to or greater than the width of the second dented portion.

The lead film may have gas permeability of 20 Barrer to 60 Barrer at 60° C.

The lead film may have a moisture penetration amount of 0.02 g to 0.2 g for 10 years at 25° C., 50% RH.

The lead film may include a polyolefin-based material.

A ventilation layer may be inserted into the dented portion, and the ventilation layer may include a material with higher air permeability than the lead film.

The ventilation layer may have a thickness of 50 μm to 150 μm.

The ventilation layer may have gas permeability of $1.6\ e^5$ Barrer to $1.6\ e^7$ Barrer. The ventilation layer may include a polyolefin-based resin, a fluorine-based resin, a natural material, a glass fiber, a ceramic fiber, a metal fiber, or two or more thereof.

The battery cell may further comprise an inner layer configured to cover at least one of inner surfaces of the dented portion of the lead film.

The material of the inner layer may have a higher melting point than the material of the lead film and may not react with an electrolyte.

The inner layer may include at least one material among polyolefin-based, fluorine-based, and porous ceramic-based materials.

Based on a protruding direction of the electrode lead, the width of the lead film covering a front surface of the dented portion may be 2 mm or more.

The thickness of the lead film covering an upper surface of the dented portion may be 100 μm to 300 μm.

In another aspect of the present disclosure, there is also provided a battery module, comprising the battery cell described above.

Advantageous Effects

According to embodiments, the present disclosure provides a battery cell including an electrode lead to which a lead film having a dented portion that is recessed in the outer direction of the battery case and is open toward the inside of the battery case is attached, and a battery module including such a battery cell, so an external discharge amount of gas generated inside the battery cell may be improved.

In addition, according to the embodiments, in the present disclosure, the sealing portion located on the gas discharge portion of the dented portion includes an indented sealing portion that is recessed inward at the outer side of the battery case and does not overlap with at least a part of the gas discharge portion on a plane, so the external discharge amount of gas generated inside the battery cell may be improved.

The effect of the present disclosure is not limited to the above effects, and the effects not mentioned here will be clearly understood by those skilled in the art from this specification and the accompanying drawings.

BEST MODE

Hereinafter, with reference to the accompanying drawings, various embodiments of the present disclosure will be described in detail so as to be easily implemented by those skilled in the art. The present disclosure may be implemented in various different forms and is not limited to the embodiments described herein.

In order to clearly explain the present disclosure, parts irrelevant to the description are omitted, and identical or similar components are endowed with the same reference signs throughout the specification.

In addition, since the size and thickness of each component shown in the drawings are arbitrarily expressed for convenience of description, the present disclosure is not necessarily limited to the drawings. In order to clearly express various layers and regions in the drawings, the thicknesses are enlarged. Also, in the drawings, for convenience of explanation, the thickness of some layers and regions is exaggerated.

In addition, when a part of as a layer, a film, a region, a plate, or the like is explained to be "above" or "on" another part, this includes not only the case where the part is "directly on" another part, but also the case where still another part is interposed therebetween. Conversely, when a part is explained to be "directly on" another part, it means that there is no other part therebetween. In addition, when a part is explained to be "above" or "on" a reference part, it means that the part is located above or below the reference part, and does not necessarily mean that the part is located "above" or "on" the reference part in a direction opposite to the gravity.

In addition, throughout the specification, when a part "includes" a certain component, it means that other components may be further included, rather than excluding other components, unless otherwise stated.

In addition, throughout the specification, when referring to "top view", it means that the target part is viewed from above, and when referring to "cross-sectional view", it means that a vertically-cut section of the target part is viewed from a side.

Hereinafter, a pouch battery cell 100 according to an embodiment of the present disclosure will be described. However, here, the description will be made based on one of both sides of the pouch battery cell 100, but it is not necessarily limited thereto, and the same or similar contents may be described in the case of the other side.

Figure 3:
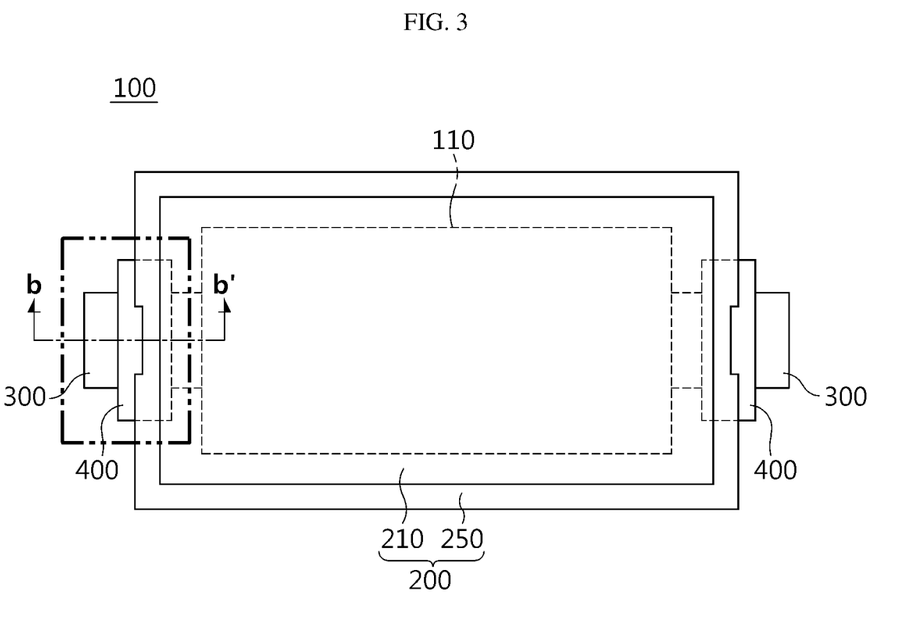
FIG. 3 is a top view showing a battery cell according to an embodiment of the present disclosure.

FIG. 3 is a top view showing a battery cell according to an embodiment of the present disclosure.

Referring to FIG. 3, a battery cell 100 according to an embodiment of the present disclosure includes a battery case 200, an electrode lead 300, and a lead film 400.

The battery case 200 includes an accommodation portion 210 in which an electrode assembly 110 is accommodated, and a sealing portion 250 formed by sealing an outer periphery thereof. The sealing portion 250 may be sealed by heat or laser. The battery case 200 may be a laminate sheet including a resin layer and a metal layer. More specifically, the battery case 200 may be made of a laminate sheet, and may include an outer resin layer forming the outermost layer, a barrier metal layer preventing penetration of materials, and an inner resin layer for sealing.

In addition, the electrode assembly 110 may have a structure of a jelly-roll type (winding type), a stack type (lamination type), or a composite type (stack/folding type). More specifically, the electrode assembly 110 may include a positive electrode, a negative electrode, and a separator disposed therebetween.

Hereinafter, the electrode lead 300 and the lead film 400 will be mainly described.

Figure 4:
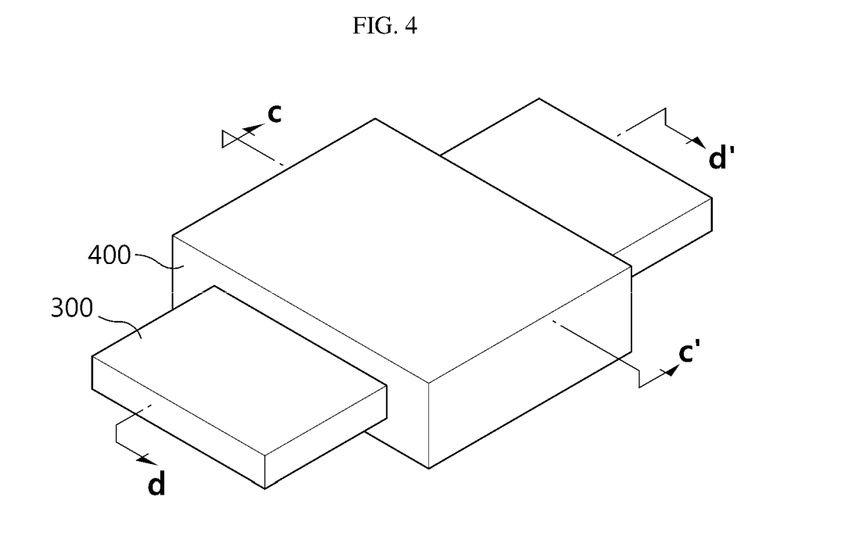
FIG. 4 is a perspective view showing an electrode lead included in the battery cell of FIG. 3.

FIG. 4 is a perspective view showing an electrode lead included in the battery cell of FIG. 3.

Referring to FIGS. 3 and 4, the electrode lead 300 is electrically connected to an electrode tab (not shown) included in the electrode assembly 110, and protrudes out of the battery case 200 through the sealing portion 250. In addition, the lead film 400 is located at a portion corresponding to the sealing portion 250 in at least one of an upper portion and a lower portion of the electrode lead 300. Accordingly, the lead film 400 may improve the sealing properties of the sealing portion 250 and the electrode lead 300 while preventing a short circuit from occurring in the electrode lead 300 during sealing.

Figure 5:
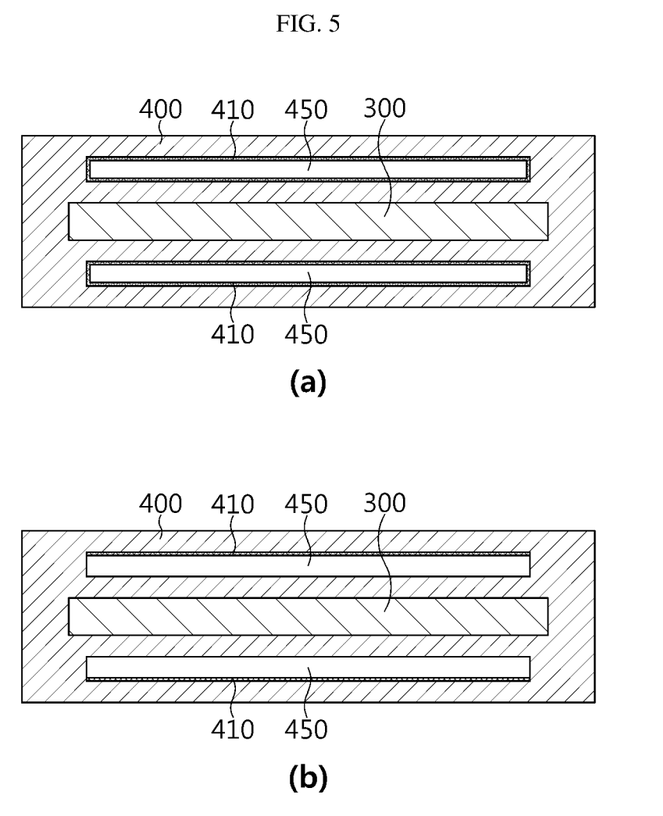
FIG. 5 is a cross-sectional view, taken along the c-c' axis of FIG. 4.
Figure 6:
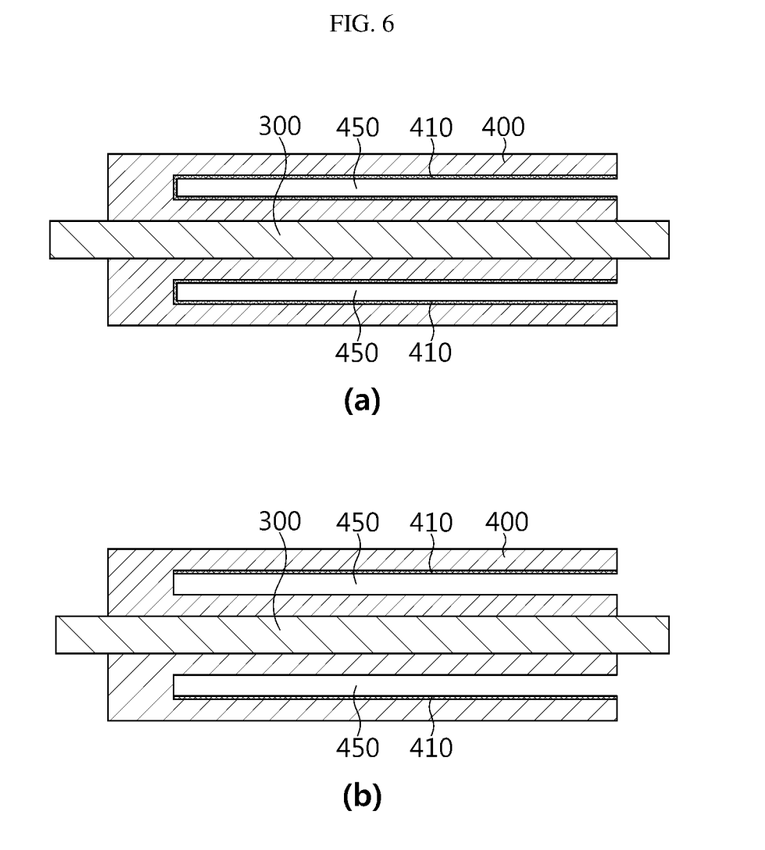
FIG. 6 is a cross-sectional view, taken along the d-d' axis of FIG. 4.

FIG. 5 is a cross-sectional view, taken along the c-c' axis of FIG. 4. FIG. 6 is a cross-sectional view, taken along the d-d' axis of FIG. 4.

Referring to FIGS. 5 and 6, the lead film 400 has a dented portion 450 recessed in the outer direction of the battery case 200, and the dented portion 450 is open toward the inside of the battery case 200. In addition, the inner surface of the dented portion 450 may be closed based on the protruding direction of the electrode lead 300.

Also, referring to FIGS. 5 and 6, the lead film 400 may further include an inner layer 410 covering at least one of inner surfaces of the dented portion 450.

For example, referring to FIGS. 5(a) and 6(a), within the dented portion 450, the inner layer 410 may cover the entire surface of the lead film 400. That is, the inner layer 410 may be formed on the entire inner surface of the dented portion 450 except for the open surface.

Accordingly, even if the lead film 400 is sealed together with the sealing portion 250 in a state of being located on at least one of the upper and lower portions of the electrode lead 300, the dented portion 450 may be preserved in an unsealed state by the inner layer 410.

As another example, referring to FIGS. 5(b) and 6(b), the inner layer 410 may cover an upper or lower surface among the inner surfaces of the dented portion 450. That is, the inner layer 410 may be formed on at least one of the upper and lower surfaces of the dented portion 450 facing each other.

Accordingly, while minimizing the inner layer 410 formed in the dented portion 450 of the lead film 400, the dented portion 450 may be preserved in an unsealed state by the inner layer 410. In addition, the manufacturing process may be simplified and the cost may be reduced.

More specifically, the inner layer 410 may be made of a material with a higher melting point than the material of the lead film 400. In addition, the inner layer 410 may be made of a material that does not react with an electrolyte included in the battery case 200. Accordingly, since the inner layer 410 is made of the above material, the dented portion 450 may be preserved or kept blank without reacting separately with the electrolyte and without causing thermal fusion, thermal deformation, or the like during the sealing process. In addition, the gas generated in the battery case 200 may be easily discharged to the outside.

In an embodiment of the present disclosure, the inner layer 410 may have a thickness of 100 μm or less.

In an embodiment of the present disclosure, the gas permeability of the inner layer 410 may be greater than or equal to 40 Barrer. For example, the carbon dioxide permeability of the inner layer 410 may satisfy the above range.

For example, the lead film 400 may include a polyolefin-based material, and the inner layer 410 may include at least one of polyolefin-based, fluorine-based, and porous ceramic-based materials. For example, the lead film 400 may include at least one of a polyolefin-based material, a fluorine-based material, and a porous ceramic-based material that satisfies the above gas permeability value. The polyolefin-based material may include at least one material selected from the group consisting of polypropylene, polyethylene, and polyvinyl difluoride (PVDF). The fluorine-based material may include at least one material selected from the group consisting of polytetrafluoroethylene and polyvinylidene fluoride. In addition, the inner layer 410 includes a getter material, so that gas permeability may be increased and moisture permeability may be minimized. For example, the getter material may be calcium oxide (CaO), barium oxide (BaO), lithium chloride (LiCl), silica ($SiO_2$), or the like, without being limited thereto, and any material that reacts with water ($H_2O$) can be used The inner layer 410 may include an adhesive material between the lead film 400 and the inner layer 410, or may be extruded together with the lead film 400 to adhere to the lead film 400. The adhesive material may include an acrylic type. In particular, when the inner layer 410 is extruded together with the lead film 400, gas permeability of the inner layer 410 may be 40 Barrer or more.

Referring to FIGS. 4 to 6, the lead film 400 includes a first lead film and a second lead film, the first lead film may be located above the electrode lead 300, and the second lead film may be located below the electrode lead 300. At this time, the electrode lead 300 is sealed together with the sealing portion 250 in a state of being located between the first lead film and the second lead film, so that the first lead film and the second lead film may be connected to each other.

Accordingly, the lead film 400 may improve the sealing property of the sealing portion 250 and the electrode lead 300 while preventing the side surface of the electrode lead 300 from being exposed to the outside.

For example, in the lead film 400, the dented portion 450 may be located in at least one of the first lead film and the second lead film. More specifically, in the lead film 400, the dented portion 450 may be formed on the first lead film or the second lead film based on the electrode lead 300, or the dented portion 450 may be formed on both the first lead film and the second lead film based on the electrode lead 300. However, the number of dented portions 450 is not limited to the above, and the dented portions 450 may be formed in an appropriate number within the lead film 400.

Accordingly, the durability and airtightness of the lead film 400 may be controlled by adjusting the number of dented portions 450 formed on the lead film 400. In addition, if necessary, the number of dented portions 450 may be minimized to simplify the manufacturing process and reduce costs.

In one embodiment of the present disclosure, the gas permeability of the lead film 400 may be 20 Barrer to 60 Barrer, or 30 Barrer to 40 Barrer at 60° C. For example, the carbon dioxide permeability of the lead film 400 may satisfy the above range. In addition, the gas permeability may satisfy the above range at 60° C. based on the thickness of the lead film 400 of 200 μm. If the gas permeability of the lead film 400 satisfies the above range, the gas generated inside the secondary battery may be more effectively discharged.

In this specification, the gas permeability may be measured by ASTM F2476-20.

In one embodiment of the present disclosure, the moisture penetration amount of the lead film 400 may be 0.02 g to 0.2 g, or 0.02 g to 0.04 g, or 0.06 g, or 0.15 g for 10 years at 25° C., 50% RH. If the moisture penetration amount of the lead film 400 satisfies the above range, the penetration of moisture from the lead film 400 may be more effectively prevented.

In this specification, the moisture penetration amount may be measured by adopting the ASTM F 1249 method. At this time, the moisture penetration amount may be measured using equipment officially certified by MCOON.

In an embodiment of the present disclosure, the lead film 400 may have a gas permeability of 20 Barrer to 60 Barrer at 60° C. and a moisture penetration amount of 0.02 g to 0.2 g at 25° C., 50% RH for 10 years. When the gas permeability and moisture penetration amount of the lead film 400 satisfy the above ranges, it may be more effective to prevent moisture penetration from the outside while discharging the gas generated inside the secondary battery.

In an embodiment of the present disclosure, the lead film 400 may include a polyolefin-based resin. For example, the lead film 400 may include a polyolefin-based resin that satisfies the above values of gas permeability and/or moisture penetration amount. The polyolefin-based resin may include one or more materials selected from the group consisting of polypropylene, polyethylene, and polyvinyldifluoride (PVDF). The lead film 400 includes polypropylene, and gas permeability of the lead film 400 may be 20 Barrer to 60 Barrer at 60° C. In addition, the moisture penetration amount may be 0.06 g to 0.15 g. In this case, it is more effective to discharge the gas generated inside the secondary battery, and it may be easy to prevent the penetration of moisture from the outside.

In addition, since the lead film 400 is made of the above-described material, the lead film 400 may maintain the airtightness of the battery cell 100 and prevent leakage of the internal electrolytic solution.

Figure 7:
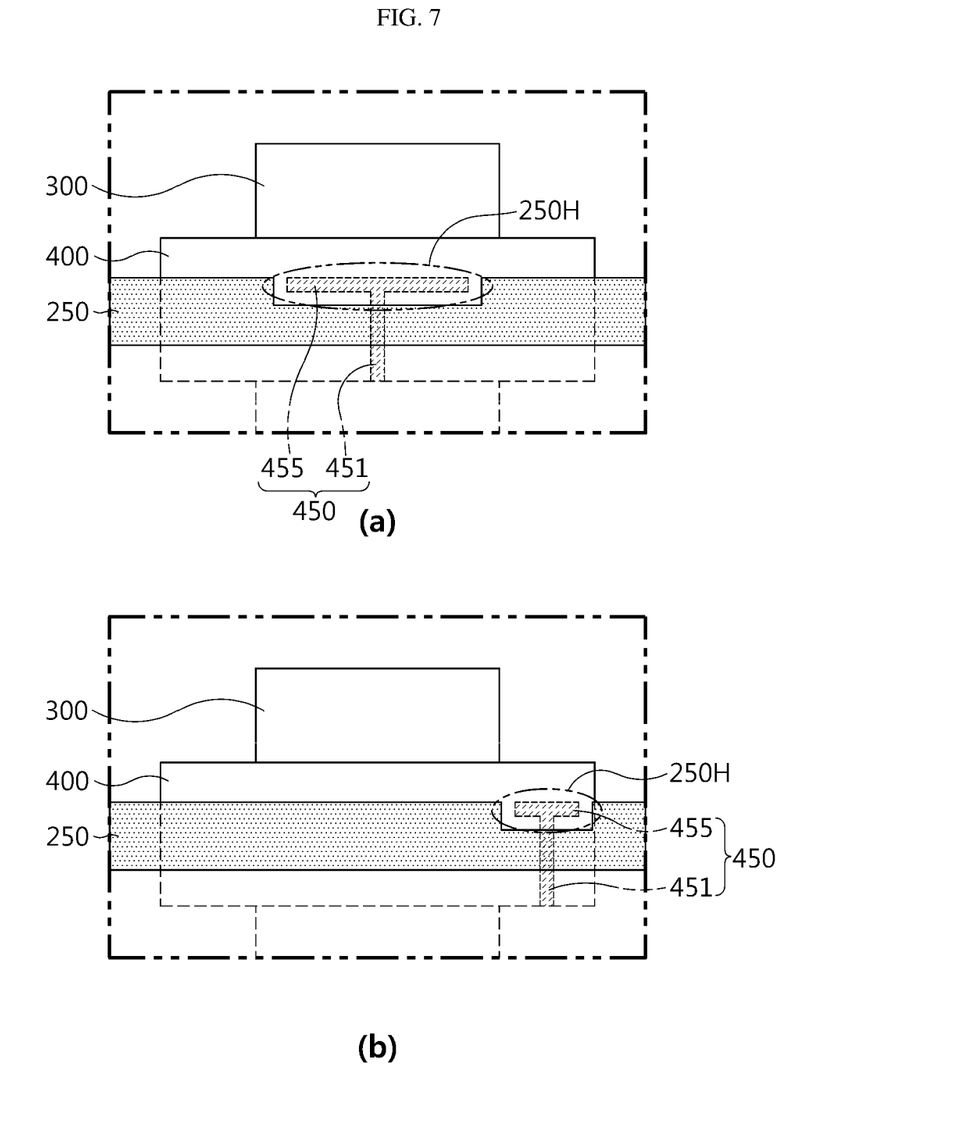
FIG. 7 is an enlarged view showing an electrode lead portion in an embodiment of the present disclosure.

FIG. 7 is an enlarged view showing an electrode lead portion in an embodiment of the present disclosure.

Referring to FIG. 7, an indented sealing portion 250H is recessed inward from at outer side of the battery case 200. More specifically, the indented sealing portion 250H may be recessed inward at the outer side of the accommodation portion 210 in the sealing portion 250.

Also, referring to FIG. 7, the indented sealing portion 250H is formed on the gas discharge portion of the dented portion 450.

When the gas generated in the battery case 200 is discharged to the outside of the battery case 200 through the dented portion 450, if the sealing portion 250 contacts the gas discharge portion, the discharge of gas to the outside of the battery case 200 may be prevented by the sealing portion 250. Accordingly, there is a problem in that the amount of gas discharged to the outside of the battery case 200 is greatly reduced. For example, the gas inside the dented portion 450 may be discharged to the outside of the battery case 200 by gas permeation on the lead film at the upper surface of the recessed end of the dented portion 450 in the lead film 400. Here, if the lead film 400 on the upper surface of the recessed end of the dented portion 450 contacts the sealing portion 250, the discharge of gas from the dented portion 450 to the outside of the battery case 200 may be blocked by the sealing portion 250.

Referring to FIG. 7, the indented sealing portion 250H is positioned on the gas discharge portion of the dented portion 450 so that at least a part of the gas discharge portion does not overlap with the sealing portion 250 on a plane. Here, that at least a part of the gas discharge portion does not overlap with the sealing portion 250 on a plane means that when the battery case 200 is viewed from above, at least a part of the gas discharge portion does not overlap with the sealing portion 250. In other words, interference between the gas discharge portion of the dented portion 450 and the sealing portion 250 in the lead film 400 may be avoided.

Referring to FIG. 7, the dented portion 450 may include a first dented portion 451 and a second dented portion 455, the first dented portion 451 may extend along the protruding direction of the electrode lead 300, and the second dented portion 455 may extend along the longitudinal direction of the sealing portion 250. Here, the longitudinal direction of the sealing portion 250 refers to a direction orthogonal to the protruding direction of the electrode lead 300.

However, the shape of the dented portion 450 is not limited to the above, and the dented portion 450 may be formed in an appropriate shape within the lead film 400.

Here, one end of the first dented portion 451 is open toward the inside of the battery case 200, and the other end of the first dented portion 451 may communicate with the second dented portion 455. More specifically, the first dented portion 451 and the second dented portion 455 may be integrated with each other. That is, the first dented portion 451 may serve as a gas inlet through which the gas inside the battery case 200 is introduced into the dented portion 450, and the second dented portion 455 may serve as a gas outlet through which gas is discharged.

Also, referring to FIG. 7, the indented sealing portion 250H may be positioned on the second dented portion 455. As another example, the indented sealing portion 250H may also be positioned on the boundary line between the first dented portion 451 and the second dented portion 455.

More specifically, the indented sealing portion 250H may extend along the longitudinal direction of the second dented portion 455. Here, the length of the second dented portion 455 means a maximum value of the distance between one end and the other end of the second dented portion 455 in a direction orthogonal to the protruding direction of the electrode lead 300. In addition, the length of the indented sealing portion 250H may be equal to or greater than the length of the second dented portion 455. Here, the length of the indented sealing portion 250H means a maximum value of the distance between one end and the other end of the indented sealing portion 250H in a direction orthogonal to the protruding direction of the electrode lead 300.

Also, the width of the indented sealing portion 250H may be equal to or greater than the width of the second dented portion 455. Here, the width of the second dented portion 455 means a maximum value of the distance between one end and the other end of the second dented portion 455 in the protruding direction of the electrode lead 300. The width of the indented sealing portion 250H means a maximum value of the distance between one end and the other end of the indented sealing portion 250H in the protruding direction of the electrode lead 300.

However, the size of the indented sealing portion 250H is not limited to the above, and the indented sealing portion 250H may be formed in an appropriate size within the lead film 400.

Accordingly, in the lead film 400, the lead film 400 on the second dented portion 455 may not come into contact with the sealing portion 250. In other words, the part of the lead film 400 where the second dented portion 455 is located may avoid interference with the sealing portion 250.

Referring to FIG. 7, in the lead film 400, the dented portion 450 may be formed at various positions based on the electrode lead 300.

For example, as shown in FIG. 7(*a*), in the lead film 400, the dented portion 450 may be positioned on the electrode lead 300. More specifically, the dented portion 450 may be formed at a position corresponding to the center of the electrode lead 300.

As another example, as shown in FIG. 7(*b*), the length of the lead film 400 may be greater than the width of the electrode lead 300, and the dented portion 450 may be located between the end of the electrode lead 300 and the end of the lead film 400. Here, the length of the lead film 400 means a maximum value of the distance between one end and the other end of the lead film 400 in a direction orthogonal to the protruding direction of the electrode lead 300, and the width of the electrode lead 300 means a maximum value of the distance between one end and the other end of the electrode lead 300 in a direction orthogonal to the protruding direction of the electrode lead 300. In other words, in the lead film 400, the dented portion 450 may be formed at a position avoiding the electrode lead 300. However, the position of the dented portion 450 is not limited to the above, and the dented portion 450 may be formed at an appropriate position within the lead film 400.

Accordingly, the durability and airtightness of the lead film 400 may be controlled by adjusting the position of the dented portion 450 formed on the lead film 400. In addition, if necessary, the size of the dented portion 450 may be adjusted according to the position of the dented portion 450, thereby simplifying the manufacturing process and reducing costs.

Figure 8:
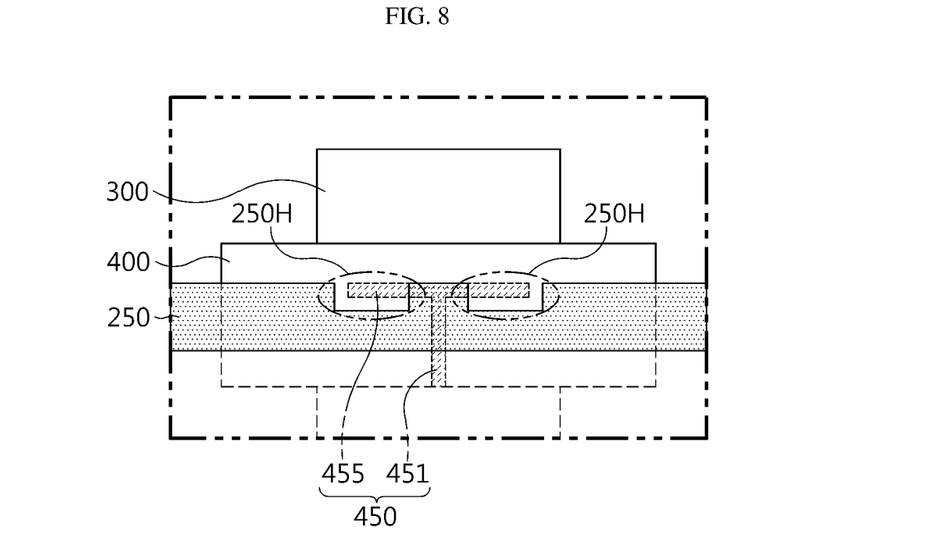
FIG. 8 is an enlarged view showing an electrode lead portion in another embodiment of the present disclosure.

FIG. 8 is an enlarged view showing an electrode lead portion in another embodiment of the present disclosure.

Referring to FIG. 8, the indented sealing portion 250H may be provided in plurality, and the plurality of indented sealing portions 250H may be spaced apart from each other. As the plurality of indented sealing portions 250H are spaced apart from each other, the sealing portion 250 of the gas discharge portion of the lead film 400 may be sealed in a concave-convex shape.

As the indented sealing portion 250H has the above structure, it may be more easy to prevent substances outside the battery, such as moisture, from penetrating from the gas discharge portion of the lead film 400 that does not interfere with the sealing portion 250.

Figure 9:
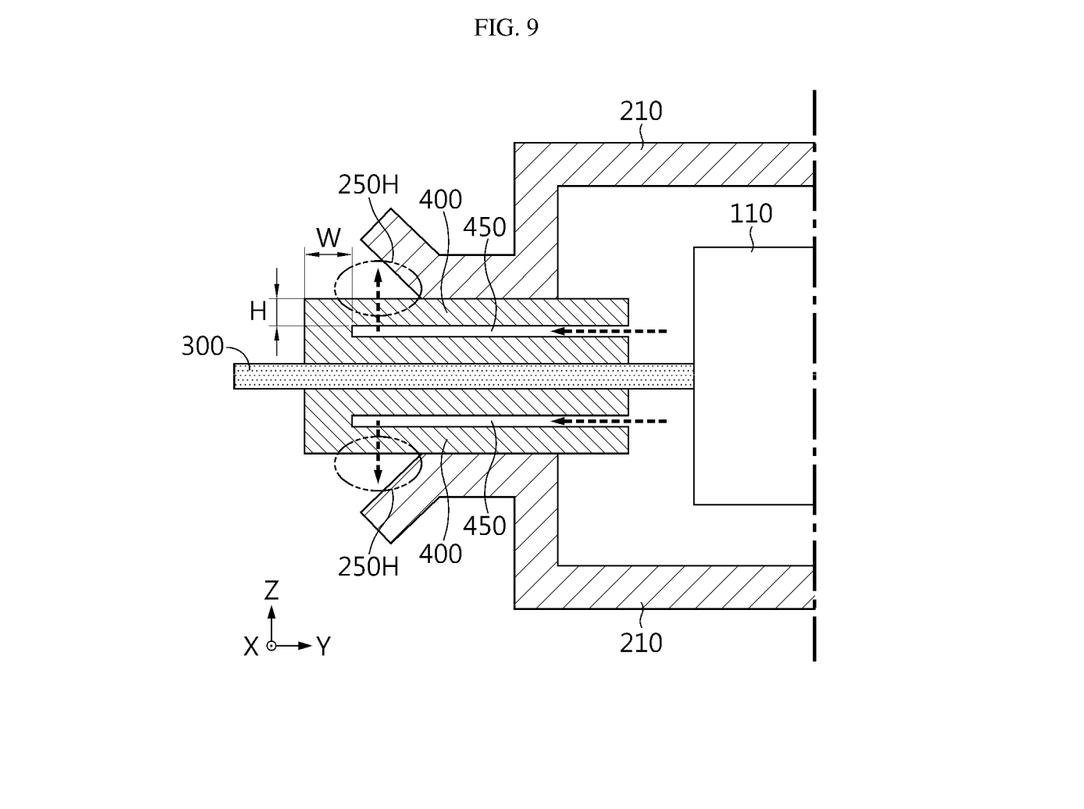
FIG. 9 is a cross-sectional view, taken along the b-b' axis of FIG. 3.

FIG. 9 is a cross-sectional view, taken along the b-b' axis of FIG. 3.

Referring to FIG. 9, the gas generated inside the battery cell 100 may be discharged to the dented portion 450 when the pressure exceeds a predetermined level. Here, since the dented portion 450 is open toward the inside, the pressure inside the dented portion 450 may be the same as the pressure inside the battery case 200.

The pressure inside the dented portion 450 is higher than the pressure outside the battery cell 100, and the resulting pressure difference may act as a driving force of the gas. Accordingly, the gas introduced into the dented portion 450 may be easily discharged to the outside. In addition, an external discharge amount of gas generated inside the battery cell 100 may also be increased.

At this time, the gas generated inside the battery case 200 may be discharged along the Z-axis direction through the dented portion 450 and the lead film 400 covering the upper surface of the dented portion.

In addition, since the dented portion 450 is open toward the inside and the inner surface of the dented portion 450 recessed toward the outside of the battery case 200 is closed, the airtightness and durability of the pouch may also be secured.

At this time, the recessed end of the dented portion 450 may serve as a gas outlet through which the gas introduced into the dented portion 450 is discharged to the outside, and the end of the dented portion 450 that is open toward the inside of the battery case 200 may serve as a gas inlet through which the gas generated in the battery case 200 is introduced.

Referring to FIG. 9, the indented sealing portion 250H is formed on the gas discharge portion of the dented portion 450.

Referring to FIG. 9, in the lead film 400, the gas discharge portion of the dented portion 450 may be exposed to the outside of the battery case 200. In this specification, the outside of the battery case 200 means an area of the sealing portion 250 located further outward than the battery case 200 based on the outer end of the battery case. In this case, in the lead film 400, the area of the dented portion 450 in which the gas discharge portion is exposed to the outside of the battery case 200 increases, so that the gas may be discharged to the outside of the battery case 200 more smoothly.

In an embodiment of the present disclosure, the second dented portion 455 may be exposed to the outside of the battery case 200. When the area of the lead film 400 where the second dented portion 455 is exposed to the outside of the battery case 200 is increased, the gas inside the battery case 200 may be smoothly discharged to the outside of the battery case 200.

Referring to FIG. 9, the thickness H of the lead film 400 covering the upper surface of the dented portion 450 may be 100 μm to 300 μm, or 100 μm to 200 μm. When the thickness H of the lead film 400 covering the upper surface of the dented portion 450 satisfies the above range, the gas inside the battery case 200 may be more easily discharged to the outside.

Referring to FIG. 9, based on the protruding direction of the electrode lead 300, the width W of the lead film 400 covering the front surface of the dented portion 450 may be 2 mm or more, or 2 mm to 3 mm. Here, the width of the lead film 400 surrounding the front surface of the dented portion 450 means a maximum value of the distance between the recessed end of the dented portion 450 and the outer end of the battery case 200 of the lead film 400. When the width W of the lead film 400 surrounding the front surface of the dented portion 450 satisfies the above range, it may be more easy to prevent the lead film 400 from being torn in the process of discharging the gas generated inside the battery case 200 to the outside.

Figure 10:
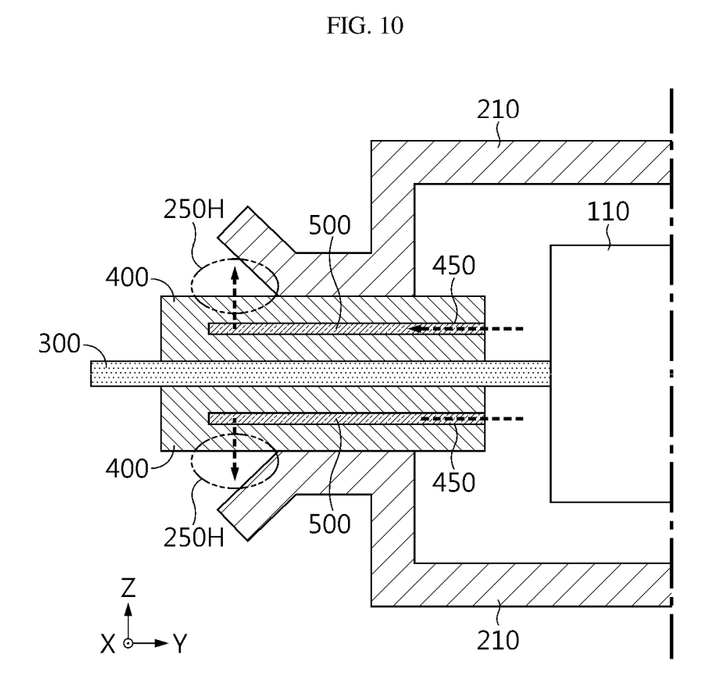
FIG. 10 is a cross-sectional view, taken along the b-b' axis of FIG. 3 in another embodiment of the present disclosure.

FIG. 10 is a cross-sectional view, taken along the b-b' axis of FIG. 3 in another embodiment of the present disclosure.

Referring to FIG. 10, a ventilation layer 500 may be inserted into the dented portion 450. The ventilation layer 500 includes a material with higher air permeability than the lead film 400. Higher air permeability may mean that when a gas having a predetermined pressure is permeated in one direction, the amount of permeable gas is relatively greater. When the ventilation layer 500 is inserted into the dented portion 450, the gas generated inside the battery case 200 may be introduced into the dented portion 450 by the ventilation layer 500 with high air permeability even if the pressure is not higher than a predetermined pressure, so that the gas inside the battery may be more easily discharged to the outside of the battery.

For example, the ventilation layer 500 may include a more porous material than the lead film 400. That is, the ventilation layer 500 may include a material having a higher porosity per unit volume than the lead film 400.

In an embodiment of the present disclosure, the gas permeability of the ventilation layer 500 may be $1.6\ e^5$ Barrer to $1.6\ e^7$ Barrer, or $1\ e^6$ Barrer to $3\ e^6$ Barrer. For example, carbon dioxide permeability of the ventilation layer 500 may satisfy the above range.

In an embodiment of the present disclosure, the ventilation layer 500 may include one or more selected materials selected from the group consisting of polyolefin-based resin, fluorine-based resin, natural material, glass fiber, ceramic fiber, and metal fiber. For example, the ventilation layer 500 may include one or more selected materials selected from the group consisting of polyolefin-based resin, fluorine-based resin, natural material, glass fiber, ceramic fiber, and metal fiber that satisfy the above gas permeability value. The polyolefin-based resin may include one or more materials selected from the group consisting of polypropylene, polyethylene, and polyvinyldifluoride (PVDF). The fluorine-based resin may include one or more materials selected from the group consisting of polytetrafluoroethylene and polyvinylidene fluoride, and the natural material may include one or more materials selected from the group consisting of cotton and wool.

In an embodiment of the present disclosure, the ventilation layer 500 may have a thickness of 50 μm to 150 μm, or 50 μm to 100 μm. When the thickness of the ventilation layer 500 satisfies the above range, the gas generated inside the battery case 200 may be more easily introduced into the dented portion 450.

In an embodiment of the present disclosure, the ventilation layer 500 may include a material that is stable in an electrolyte environment, namely does not react with the electrolyte inside the battery case 200. For example, the ventilation layer 500 may include one or more materials selected from the group consisting of polypropylene, polyvinyldifluoride (PVDF), and polytetrafluoroethylene.

A battery module according to another embodiment of the present disclosure includes the battery cell described above. Meanwhile, one or more battery modules according to this embodiment may be packaged in a pack case to form a battery pack.

The battery module described above and the battery pack including the same may be applied to various devices. These devices may be transportation means such as electric bicycles, electric vehicles, hybrid electric vehicles, and the like, but the present disclosure is not limited thereto, and the present disclosure may be applied various devices that can use a battery module and a battery pack including the same, which is also within the scope of the right of the present disclosure.

Although the preferred embodiment of the present disclosure has been described in detail above, the scope of the right of the present disclosure is not limited thereto, and various modifications and improvements made by those skilled in the art using the basic concept of the present disclosure defined in the appended claims also fall within the scope of the right of the present disclosure.

REFERENCE SIGNS

100: battery cell
110: electrode assembly
200: battery case
210: accommodation portion
250: sealing portion
250H: indented sealing portion
300: electrode lead
400: lead film
410: inner layer
450: dented portion
451: first dented portion
455: second dented portion
500: ventilation layer

What is claimed is:

1. A battery cell, comprising:
a battery case having an accommodation portion in which an electrode assembly is mounted, and a sealing portion formed by sealing an outer periphery thereof;
an electrode lead electrically connected to an electrode tab included in the electrode assembly and protruding out of the battery case through the sealing portion; and
a lead film located at a portion corresponding to the sealing portion in at least one of an upper portion or a lower portion of the electrode lead,
wherein the lead film has a dented portion recessed in an outer direction of the battery case,
the dented portion is open toward the inside of the battery case,
the sealing portion located on a gas discharge portion of the dented portion has an indented sealing portion recessed inward at an outer side of the battery case, and
the indented sealing portion does not overlap with at least a part of the gas discharge portion on a plane.

2. The battery cell according to claim 1,
wherein the gas discharge portion of the dented portion is exposed to the outside of the battery case.

3. The battery cell according to claim 1,
wherein the indented sealing portion is provided in plurality, and the plurality of indented sealing portions are spaced apart from each other.

4. The battery cell according to claim 1,
wherein the dented portion includes a first dented portion and a second dented portion,
the first dented portion extends along a protruding direction of the electrode lead, and
the second dented portion extends along a longitudinal direction of the sealing portion.

5. The battery cell according to claim 4,
wherein one end of the first dented portion is open toward the inside of the battery case, and the other end of the first dented portion communicates with the second dented portion.

6. The battery cell according to claim 4,
wherein the indented sealing portion is located on the second dented portion.

7. The battery cell according to claim 6,
wherein the indented sealing portion extends along the longitudinal direction of the second dented portion.

8. The battery cell according to claim 7,
wherein a length of the indented sealing portion is equal to or greater than a length of the second dented portion.

9. The battery cell according to claim 6,
wherein a width of the indented sealing portion is equal to or greater than a width of the second dented portion.

10. The battery cell according to claim 1,
wherein the lead film has gas permeability of 20 Barrer to 60 Barrer at 60° C.

11. The battery cell according to claim 1,
wherein the lead film has a moisture penetration amount of 0.02 g to 0.2 g for 10 years at 25° C., 50% RH.

12. The battery cell according to claim 1,
wherein the lead film includes a polyolefin-based material.

13. The battery cell according to claim 1,
wherein a ventilation layer is inserted into the dented portion, and
the ventilation layer includes a material with higher air permeability than an air permeability of the lead film.

14. The battery cell according to claim 13,
wherein the ventilation layer has a thickness of 50 μm to 150 μm.

15. The battery cell according to claim 13,
wherein the ventilation layer has gas permeability of 1.6 $e^5$ Barrer to 1.6 $e^7$ Barrer.

16. The battery cell according to claim 13,
wherein the ventilation layer includes a polyolefin-based resin, a fluorine-based resin, a natural material, a glass fiber, a ceramic fiber, a metal fiber, or a combination thereof.

17. The battery cell according to claim 1, further comprising:
an inner layer configured to cover at least one inner surfaces of the dented portion of the lead film.

18. The battery cell according to claim 17,
wherein a material of the inner layer has a higher melting point than a material of the lead film and does not react with an electrolyte.

19. The battery cell according to claim 18,
wherein the inner layer includes at least one material among polyolefin-based, fluorine-based, or porous ceramic-based materials.

20. A battery module, comprising the battery cell according to claim 1.

* * * * *